United States Patent
Wood et al.

(10) Patent No.: US 10,274,175 B1
(45) Date of Patent: Apr. 30, 2019

(54) SYSTEMS AND METHODS FOR CONTROLLING THE POSITION OF A MOVING LIGHT FIXTURE

(71) Applicant: Electronic Theatre Controls, Inc., Middleton, WI (US)

(72) Inventors: Michael Wood, Austin, TX (US); Thomas Peterson, Middleton, WI (US); Scott Ingham, Middleton, WI (US); Maxwell Schweiner, Middleton, WI (US); Matthew Stoner, Middleton, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 4 days.

(21) Appl. No.: 15/862,047

(22) Filed: Jan. 4, 2018

(51) Int. Cl.
| | | |
|---|---|---|
| *F21V 21/15* | (2006.01) | |
| *F21V 21/30* | (2006.01) | |
| *F21V 23/02* | (2006.01) | |
| *G01D 5/14* | (2006.01) | |
| *F21W 131/406* | (2006.01) | |

(52) U.S. Cl.
CPC .............. *F21V 21/15* (2013.01); *F21V 21/30* (2013.01); *G01D 5/145* (2013.01); *F21V 23/02* (2013.01); *F21W 2131/406* (2013.01)

(58) Field of Classification Search
CPC .......... F21V 21/15; F21V 21/30; F21V 23/02; F21W 2131/406; G01D 5/145; F21S 9/04; F21L 13/00
See application file for complete search history.

(56) References Cited

U.S. PATENT DOCUMENTS

| | | |
|---|---|---|
| 3,279,624 A | 10/1966 | Devol |
| 4,568,866 A | 2/1986 | Floro et al. |
| 5,010,459 A | 4/1991 | Taylor et al. |
| 5,209,560 A | 5/1993 | Taylor et al. |
| 5,406,176 A | 4/1995 | Sugden |
| 5,769,531 A | 6/1998 | Hunt et al. |
| 6,464,376 B1 * | 10/2002 | Willson ................ F21V 7/0008 362/284 |
| 6,713,985 B2 | 3/2004 | Aoshima |
| 6,866,402 B2 | 3/2005 | Belliveau |

(Continued)

FOREIGN PATENT DOCUMENTS

CN 201037628 3/2008

*Primary Examiner* — Alan B Cariaso
(74) *Attorney, Agent, or Firm* — Michael Best & Friedrich LLP

(57) ABSTRACT

Moving light fixture and method for controlling the position of a moving light fixture. In one example, the moving light fixture includes a housing, light sources, a stepper motor, a magnetic position encoder, and an electronic controller. The stepper motor rotates the housing. The magnetic position encoder is configured to transmit a position signal indicating an angular position of the housing. The electronic controller determines the angular position of the housing based on the position signal. The electronic controller also determines a full step of the stepper motor based on the angular position of the housing, and a micro step of the stepper motor. The electronic controller also determines a current position of the moving light fixture based on the full step and the micro step. The electronic controller drives the stepper motor to move the moving light fixture from the current position to a target position.

20 Claims, 8 Drawing Sheets

(56) References Cited

U.S. PATENT DOCUMENTS

| | | |
|---|---|---|
| 7,233,831 B2 | 6/2007 | Blackwell |
| 7,262,575 B2 | 8/2007 | Kircanski et al. |
| 7,355,523 B2 | 4/2008 | Sid |
| 7,446,671 B2 | 11/2008 | Giannopoulos et al. |
| 7,654,693 B2 | 2/2010 | Rasmussen et al. |
| 8,134,307 B2 | 3/2012 | Fontijn |
| 8,449,141 B1 | 5/2013 | Hinrichs |
| 8,942,572 B2 | 1/2015 | Rothenberg |
| 9,217,559 B2 | 12/2015 | Rasmussen et al. |
| 2009/0231852 A1 | 9/2009 | Vinter et al. |
| 2010/0097808 A1* | 4/2010 | Jurik ................. F21V 21/15 362/296.01 |
| 2012/0153838 A1 | 6/2012 | Schenk et al. |
| 2015/0098709 A1 | 4/2015 | Breuer et al. |
| 2017/0108199 A1* | 4/2017 | Venturati ............ F16H 25/2015 |
| 2018/0234001 A1* | 8/2018 | Dalsgaard .............. H02K 37/24 |

\* cited by examiner

SYSTEMS AND METHODS FOR CONTROLLING THE POSITION OF A MOVING LIGHT FIXTURE

BACKGROUND

This disclosure relates to controlling the position of a moving light fixture.

Full positional feedback is important for moving light fixtures. Moving light fixtures are often propelled by either DC servo motors or stepper motors. DC servo motors provide full positional feedback. However, DC servo motors are extremely expensive and cost prohibitive for new product development. Stepper motors are relative position devices that require a known reference position. The pan and tilt axes in a moving light fixture with stepper motors typically requires homing to a known position on start-up. This homing operation takes time to complete and requires that the moving light fixture has full, unencumbered movement. It precludes operating the moving light fixture on a tightly packed lighting bar, directing the moving light fixture through a window or aperture, or otherwise operating the moving light fixture with a restricted range of movement. The homing operation also produces an undesirable noise in theatrical environments, especially if re-homing needs to occur during a live production.

Some conventional moving light fixtures with stepper motors address this issue using optical quadrature encoders. However, optical quadrature encoders provide only relative positional feedback, not absolute. In addition, optical encoders allow a moving light fixture with stepper motors to correct its position while in use, but does not provide an immediate known position upon power up. Thus, a homing operation is still required.

Other conventional moving light fixtures address this issue using full resolution rotational absolute position sensors. However, sensors of this type that provide the resolution required for moving light fixtures are prohibitively expensive.

SUMMARY

The disclosure provides a moving light fixture. In one embodiment, moving light fixture includes a housing, one or more light sources, a stepper motor, a magnetic position encoder, and an electronic controller. The one or more light sources are disposed within the housing. The stepper motor is operably coupled to the housing such that the stepper motor rotates the housing about an axis of rotation. The magnetic position encoder is configured to transmit a position signal indicating an angular position of the housing about the axis of rotation. The electronic controller is configured to receive a target position of the moving light fixture. The electronic controller is also configured to determine the angular position of the housing about the axis of rotation based on the position signal. The electronic controller is further configured to determine a current full step of the stepper motor based on the angular position of the housing about the axis of rotation. The electronic controller is also configured to determine a current micro step of the stepper motor. The electronic controller is further configured to determine a current position of the moving light fixture based on the current full step of the stepper motor and the current micro step of the stepper motor. The electronic controller is also configured to drive the stepper motor to move the moving light fixture from the current position to the target position.

The disclosure also provides a method of controlling a position of a moving light fixture. In one embodiment, the moving light fixture includes a housing, one or more light sources, and a stepper motor. The one or more light sources are disposed within the housing. The stepper motor is operably coupled to the housing such that the stepper motor rotates the housing about an axis of rotation. The method includes receiving a target position of the moving light fixture. The method also includes determining, with a magnetic position encoder, an angular position of the housing about the axis of rotation. The method further includes determining, with an electronic controller, a current full step of the stepper motor based on the angular position of the housing about the axis of rotation. The method also includes determining a current micro step of the stepper motor with the electronic controller. The method further includes determining, with the electronic controller, a current position of the moving light fixture based on the current full step of the stepper motor and the current micro step of the stepper motor. The method also includes driving the stepper motor to move the moving light fixture from the current position to the target position.

The disclosure further provides a moving light fixture. In one embodiment, the moving light fixture includes a housing, one or more light sources, a first stepper motor, a second motor, a first magnetic position encoder, a second magnetic position encoder, and an electronic controller. The one or more light sources are disposed within the housing. The first stepper motor is operably coupled to the housing such that the first stepper motor rotates the housing about a first axis of rotation. The second stepper motor is operably coupled to the housing such that the second stepper motor rotates the housing about a second axis of rotation. The first magnetic position encoder is configured to transmit a first position signal indicating a first angular position of the housing about the first axis of rotation. The second magnetic position encoder is configured to transmit a second position signal indicating a second angular position of the housing about the second axis of rotation. The electronic controller is configured to receive a target position of the moving light fixture. The electronic controller is also configured to determine the first angular position of the housing about the first axis of rotation based on the first position signal. The electronic controller is further configured to determine the second angular position of the housing about the second axis of rotation based on the second position signal. The electronic controller is also configured to determine a current full step of the first stepper motor based on the first angular position of the housing about the first axis of rotation. The electronic controller further configured to determine a current full step of the second stepper motor based on the second angular position of the housing about the second axis of rotation. The electronic controller is also configured to determine a current position of the moving light fixture based on the current full step of the first stepper motor and the current full step of the second stepper motor. The electronic controller is further configured to drive the first stepper motor and the second stepper motor to move the moving light fixture from the current position to the target position.

Other aspects of the disclosure will become apparent by consideration of the detailed description and accompanying drawings.

DETAILED DESCRIPTION

Figure 1:
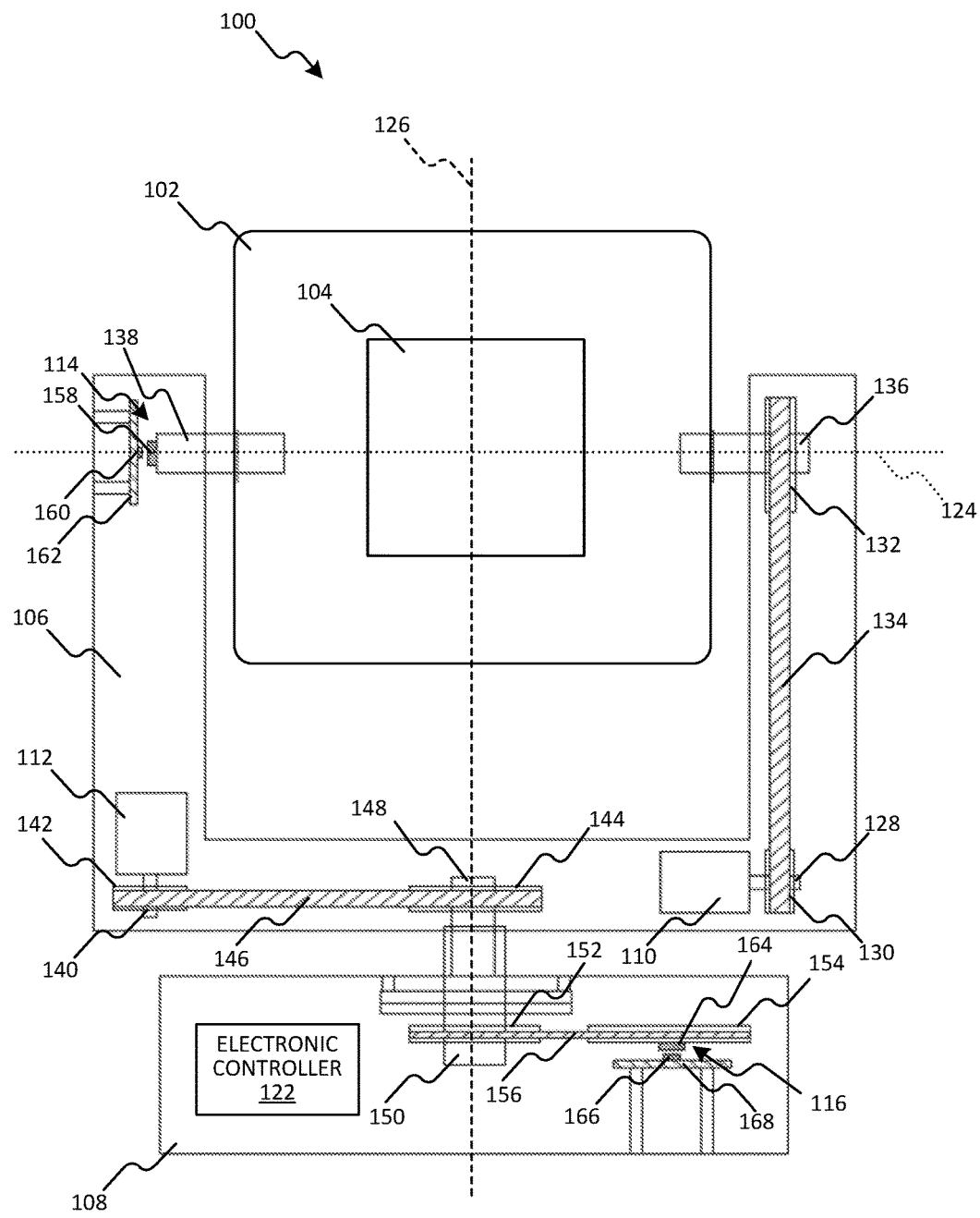
FIG. 1 is a diagram of a moving light fixture, in accordance with some embodiments.

Before any implementations of the disclosure are explained in detail, it is to be understood that the disclosure is not limited in its application to the details of construction and the arrangement of components set forth in the following description or illustrated in the following drawings. The disclosure is capable of other implementations and of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using other known means including direct connections, wireless connections, etc.

It should also be noted that a plurality of hardware and software based devices, as well as a plurality of different structural components may be utilized to implement the disclosure. Furthermore, and as described in subsequent paragraphs, the specific configurations illustrated in the drawings are intended to exemplify implementations of the disclosure. Alternative configurations are possible.

The embodiments described herein relate to systems, methods, and devices for controlling the position of an automated luminaire or moving light fixture. The moving light fixture includes, among other things, one or more light sources (for example, incandescent light sources, LED light sources, etc.), one or more stepper motors, and an electronic controller. The electronic controller is configured to regulate or control the position of the moving light fixture based on full positional feedback. For example, the electronic controller uses the current position of the moving light fixture to determine how to operate the one or more stepper motors to move the moving light fixture to a target position. However, upon power up, the current position of the moving light fixture is unknown. As such, the electronic controller is configured to determine the absolute position of the moving light fixture.

In some implementations, moving light fixtures are used in, for example, a theatre, a hall, an auditorium, a studio, or the like. Each moving light fixture 100 includes, among other things, a housing 102, one or more light sources 104, a frame 106, a base 108, a first stepper motor 110, a second stepper motor 112, a first magnetic position encoder 114, a second magnetic position encoder 116, and an electronic controller 122, as illustrated in FIG. 1. The one or more light sources 104 are positioned within the housing 102. The first stepper motor 110 is operably coupled to the housing 102 such that the first stepper motor 110 rotates the housing 102 about a first axis of rotation 124. The second stepper motor 112 is operably coupled to the housing 102 such that the second stepper motor 112 rotates the housing 102 about a second axis of rotation 126. In some embodiments, the second axis of rotation 126 is perpendicular to the first axis of rotation 124.

In the example embodiment illustrated in FIG. 1, the first stepper motor 110 is configured to apply torque to a first output shaft 128. A first pulley 130 is mounted on the first output shaft 128 for rotation together therewith. The first pulley 130 is coupled to a second pulley 132 via a first belt 134 to transfer torque therebetween. The second pulley 132 is mounted to a first shaft 136 for rotation together therewith. The first shaft 136 is fixably coupled to the housing 102 such that the housing 102 and the first shaft 136 rotate together about the first axis of rotation 124. The housing 102 is also fixably coupled to a second shaft 138 such that the second shaft 138, the housing 102, and the first shaft 136 all rotate together about the first axis of rotation 124.

In the example embodiment illustrated in FIG. 1, the second stepper motor 112 is configured to apply torque to a second output shaft 140. A third pulley 142 is mounted on the second output shaft 140 for rotation together therewith. The third pulley 142 is coupled to a fourth pulley 144 via a second belt 146 to transfer torque therebetween. The fourth pulley 144 is fixably coupled to a third shaft 148. The third shaft 148 is fixably coupled to the base 108. In operation, the second stepper motor 112 applies a torque to the fourth pulley 144 (via the second output shaft 140, the third pulley 142, and the second belt 146) which causes the frame 106 to rotate about the second axis of rotation 126. The housing 102 is coupled to the frame 106 via the first shaft 136 and the second shaft 138 such that the housing 102 rotates with the frame 106 about the second axis of rotation 126. A fourth shaft 150 is fixably coupled to the frame 106 such that the fourth shaft 150, the frame 106, and the housing 102 all rotate together about the second axis of rotation 126. The fourth shaft 150 partially extends into the base 108 along the second axis of rotation 126. A fifth pulley 152 is fixable mounted to the fourth shaft 150 such that the fifth pulley 152, the fourth shaft 150, the frame 106, and the housing 102 all rotate together about the second axis of rotation 126. The fifth pulley 152 is coupled to a sixth pulley 154 via a third belt 156 to transfer torque therebetween.

The first magnetic position encoder 114 is configured to measure the angular position of the housing 102 about the first axis of rotation 124. The first magnetic position encoder 114 includes, among other things, a first magnet 158 and a first magnetic position sensor 160. In the example embodiment illustrated in FIG. 1, the first magnet 158 is fixably mounted to an end of the second shaft 138 such that the first magnet 158, the second shaft 138, the housing 102, and the first shaft 136 all rotate together about the first axis of rotation 124. The first magnetic position sensor 160 is fixably mounted to the frame 106 via a first circuit board 162. In some embodiments, the first magnet 158 is fixably mounted to an end of the first shaft 136 such that the first magnet 158, the first shaft 136, and the housing 102 all rotate together about the first axis of rotation 124. Alternatively, in some embodiments, the first magnetic position sensor 160 is fixably mounted to an end of the first shaft 136 or the second shaft 138 such that the first magnetic position sensor 160, the first shaft 136, the second shaft 138, and the housing 102 all rotate together about the first axis of rotation 124. In such embodiments, the first magnet 158 is fixably mounted to the frame 106, for example, via the first circuit board 162.

The first magnetic position sensor 160 is positioned adjacent to the first magnet 158 such that the first magnetic position sensor 160 measures the angular position of the first magnet 158. Rotational movement of the housing 102 about the first axis of rotation 124 changes the relative angular position between the first magnet 158 and the first magnetic position sensor 160. Thus, the measured angular position of the first magnet 158 directly correlates to the angular position of the housing about the first axis of rotation 124.

The second magnetic position encoder 116 is configured to measure the angular position of the housing 102 about the second axis of rotation 126. The second magnetic position encoder 116 includes, among other things, a second magnet 164 and a second magnetic position sensor 166. In the example embodiment illustrated in FIG. 1, the second magnet 164 is fixably mounted to the sixth pulley 154 for rotation together therewith. The second magnetic position sensor 166 is fixably mounted to the base 108 via a second circuit board 168. In some embodiments, the second magnetic position sensor 166 is fixably mounted to the sixth pulley 154 for rotation together therewith. In such embodiments, the second magnet 164 is fixably mounted to the base 108, for example, via the second circuit board 168.

The second magnetic position sensor 166 is positioned adjacent to the second magnet 164 such that the second magnetic position sensor 166 measures the angular position of the second magnet 164. Rotational movement of the housing 102 about the second axis of rotation 126 changes the relative angular position between the second magnet 164 and the second magnetic position sensor 166. Thus, the measured angular position of the second magnet 164 directly correlates to the angular position of the housing about the second axis of rotation 126.

Figure 2A:
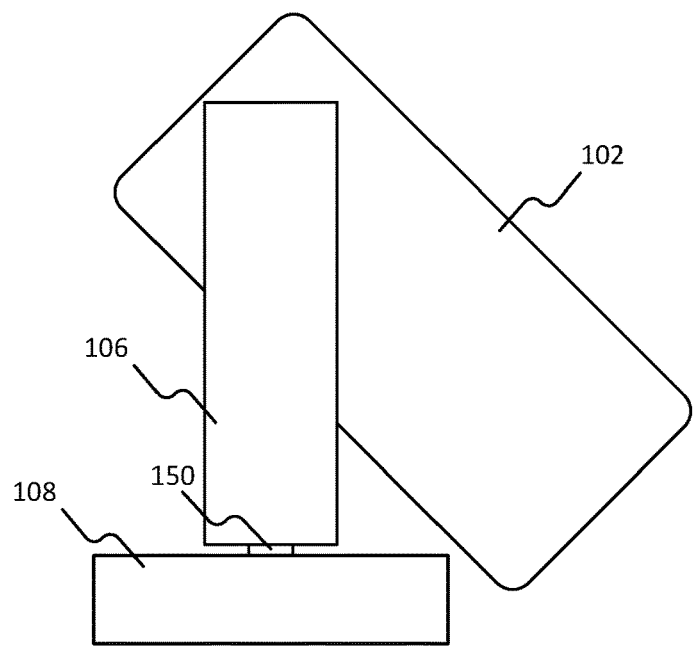
FIG. 2A is a side view of a moving light fixture at a first tilt position, in accordance with some embodiments.
Figure 2B:
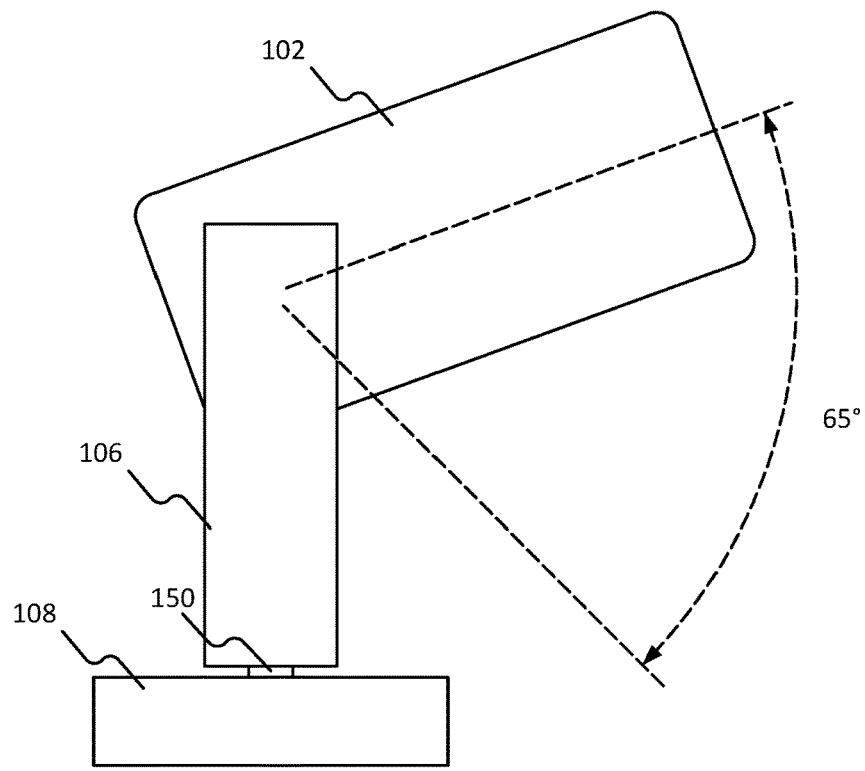
FIG. 2B is a side view of a moving light fixture at a second tilt position, in accordance with some embodiments.

As described above, the first stepper motor 110 is operably configured to rotate the housing 102 about the first axis of rotation 124. In some embodiments, rotation about the first axis of rotation 124 is a tilting motion. FIG. 2A is a side view of the moving light fixture 100 in which the housing 102 is positioned at a first angular position on the first axis of rotation 124 (for example, a reference tilt position). FIG. 2B is a side view of the moving light fixture 100 after the housing 102 is rotated about the first axis of rotation 124 such that the housing 102 is positioned at a second angular position on the first axis of rotation 124. The angle between the first angular position illustrated in FIG. 2A and the second angular position illustrated in FIG. 2B is 65 degrees.

Figure 3A:
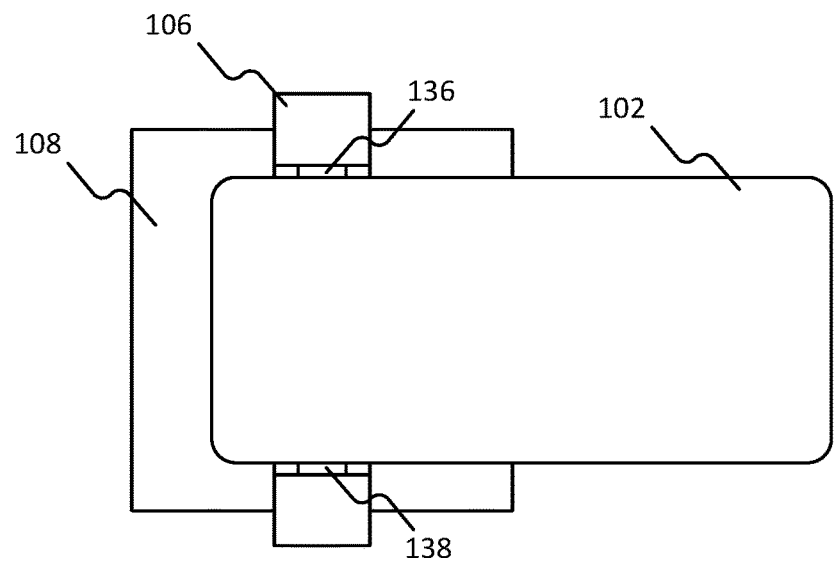
FIG. 3A is a top view of a moving light fixture at a first pan position, in accordance with some embodiments.
Figure 3B:
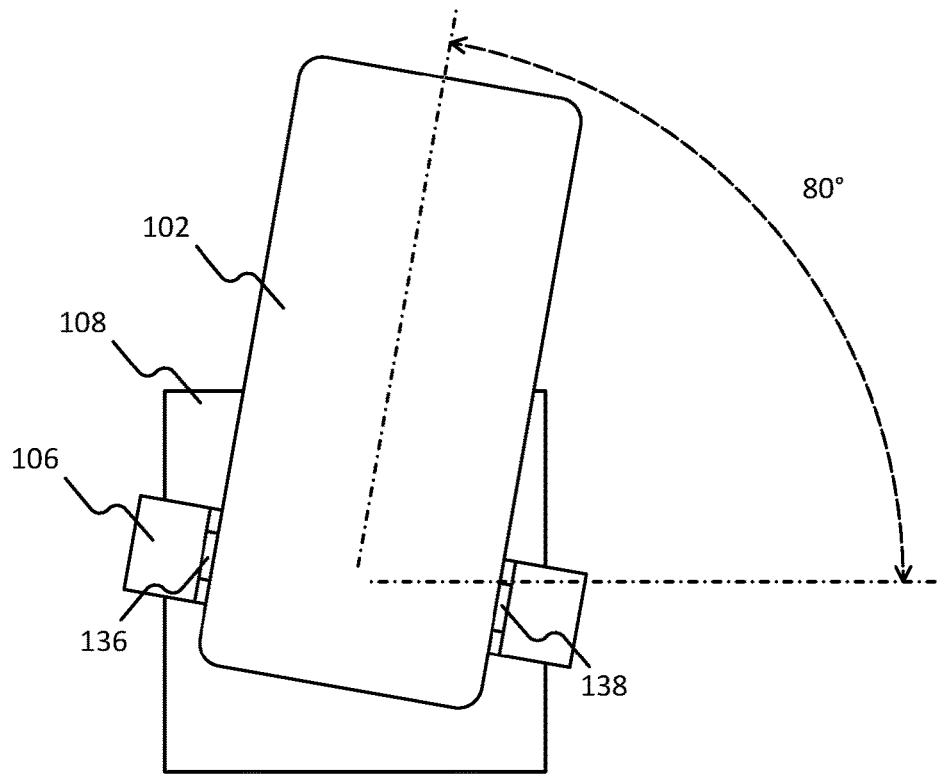
FIG. 3B is a top view of a moving light fixture at a second pan position, in accordance with some embodiments.

Also, as described above, the second stepper motor 112 is operably configured to rotate the frame 106 and the housing 102 about the second axis of rotation 126. In some embodiments, rotation about the second axis of rotation 126 is a panning motion. FIG. 3A is a top view of the moving light fixture 100 in which the housing 102 and the frame 106 are positioned at a first angular position on the second axis of rotation 126 (for example, a reference pan position). FIG. 3B is a top view of the moving light fixture 100 after the housing 102 and the frame 106 are rotated about the second axis of rotation 126 such the housing 102 and the frame 106 are positioned at a second angular position on the second axis of rotation 126. The angle between the first angular position illustrated in FIG. 3A and the second angular position illustrated in FIG. 3B is 80 degrees.

Figure 4:
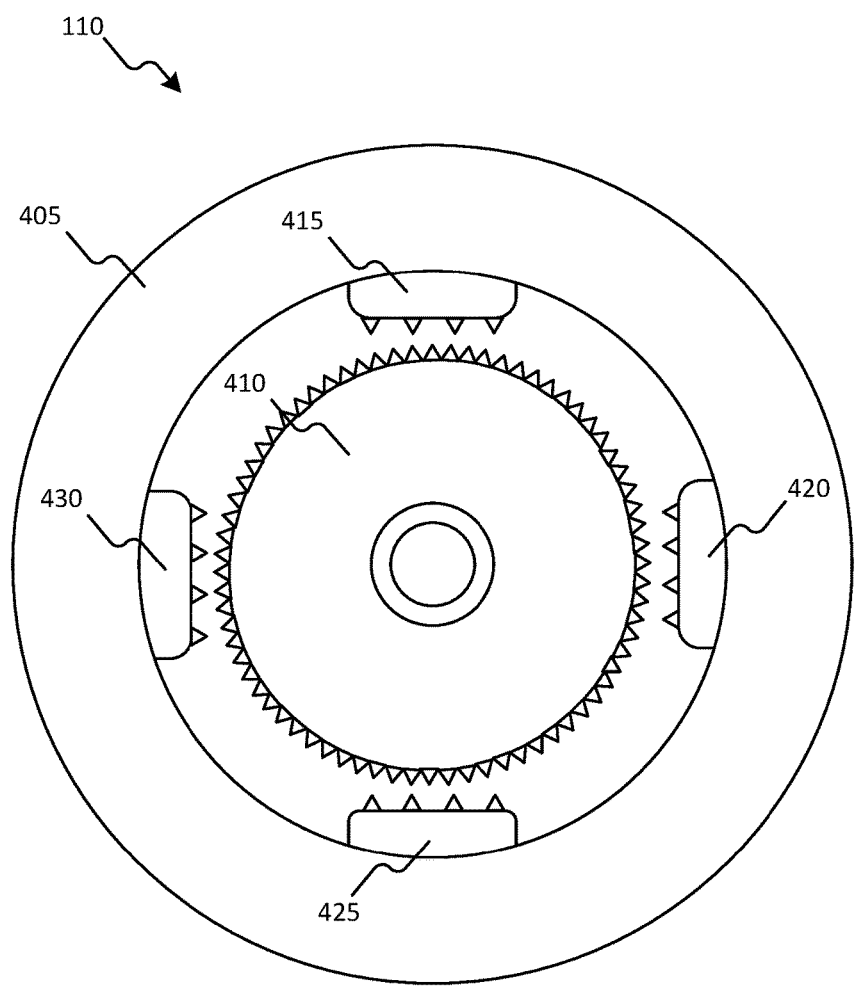
FIG. 4 is a diagram of a stepper motor, in accordance with some embodiments.

The first stepper motor 110 and the second stepper motor 112 are brushless DC electric motors that divide a full rotation into a number of equal full steps. FIG. 4 is one example embodiment of the first stepper motor 110. The example embodiment of the first stepper motor 110 illustrated in FIG. 4 includes a stator 405 and a rotor 410. The stator 405 includes, for example, four coils (for example, a first coil 415, a second coil 420, a third coil 425, and a fourth coil 430). The rotor 410 includes, for example, a gear-shaped piece of iron having a plurality of teeth. The four coils 415, 420, 425, and 430 are selectively energized to make rotor 410 rotate. For example, the first coil 415 is energized, which magnetically attracts the teeth of the rotor 410. When the teeth of the rotor 410 are aligned with first coil 415, they are slightly offset from second coil 420. Thus, when the second coil 420 is energized and the first coil 415 is de-energized, the rotor 410 rotates slightly to align the teeth of the rotor 410 with the second coil 420. Each rotation caused by energizing one of the four coils 415, 420, 425, and 430 is a full step. In some embodiments, the first stepper motor 110 includes 200 full steps. With 200 total full steps, each full step equates to approximately 1.8 degrees of rotation.

Instead of energizing one coil at a time with a full pulse of current, the first stepper motor 110 can energize two adjacent coils with partial pulses of current. For example, when the first coil 415 is energized with a pulse of current having an amplitude value of twenty-five percent and the second coil 420 is energized with a pulse of current having an amplitude value of seventy-five percent, the rotor 410 rotates to a position that is between two adjacent full steps. In this manner, the first stepper motor 110 divides each full step into a number of micro steps. The number of micro steps for each full step is set based on the amplitude resolution of the current pulses. In other words, the number of micro steps for each full step is generally equal to the number of different amplitudes values that can be generated. For example, eight bits of resolution equates to current pulses with 256 different amplitude values and, thus, 256 micro steps for each full step. In some embodiments, the first stepper motor 110 includes 256 micro steps for each full step. With 200 total full steps and 256 micro steps for each full step, each micro step equates to approximately 0.007 degrees of rotation.

In some embodiments, the second stepper motor 112 includes, among other things, all or a combination of the components described herein as being included in the first stepper motor 110.

The first magnetic position sensor 160 and the second magnetic position sensor 166 include transducers (for example, hall effect sensors) that vary their output voltages in response to a magnetic field generated by the first magnet 158 and the second magnet 164. The resolution of a rotary position sensor is defined by the number of distinct angular positions that the rotary position sensor can detect per revolution. Resolution is often described in terms of bits. For example, 10 bits of resolution equates to 1,024 detectable angular positions per revolution, and 12 bit of resolution equates to 4,096 detectable angular positions per revolution.

Figure 5A:
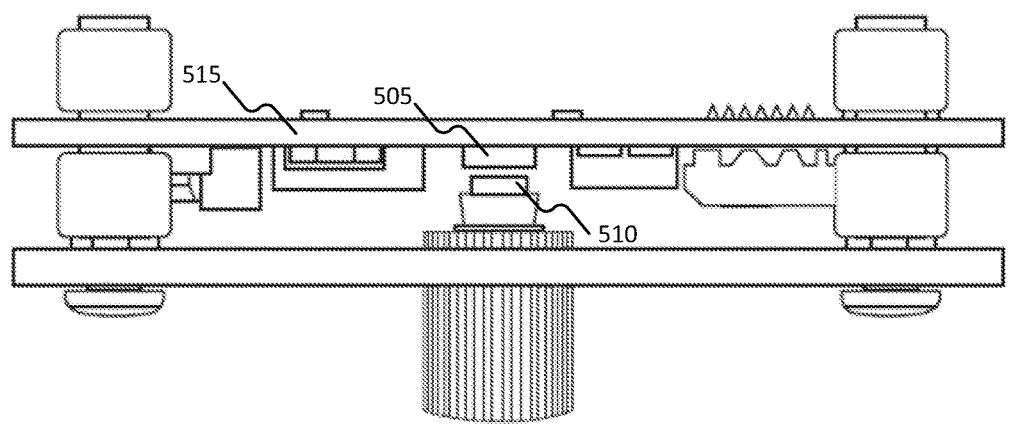
FIG. 5A is a side view of a test magnet and a 10 bit magnetic position sensor, in accordance with some embodiments.
Figure 5B:
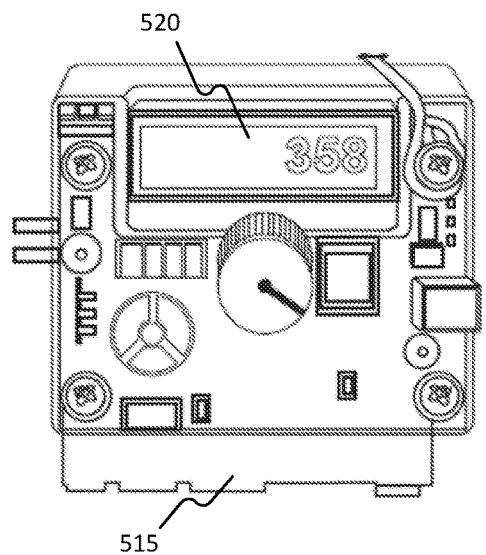
FIG. 5B is a side view of a test magnet at a first angular position and a 10 bit magnetic position sensor, in accordance with some embodiments.
Figure 5C:
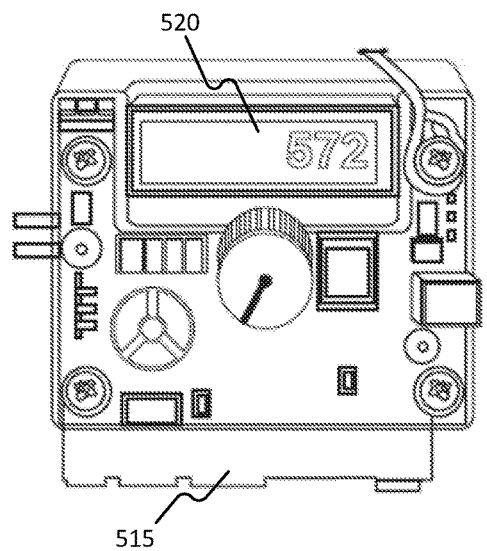
FIG. 5C is a side view of a test magnet at a second angular position and a 10 bit magnetic position sensor, in accordance with some embodiments.

FIGS. 5A, 5B, and 5C illustrate an example of a 10 bit magnetic position sensor 505 that detects the angular position of a test magnet 510. The magnetic position sensor 505 is coupled to a circuit board 515. The test magnet 510 is positioned near the 10 bit magnetic position sensor 505 such that the 10 bit magnetic position sensor 505 detects the magnetic field generated by the test magnet 510. However, as illustrated in FIG. 5A, the test magnet 510 is separated from the 10 bit magnetic position sensor 505 by a short distance. The distance between the magnetic position sensor 505 and the test magnet 510 may be, for example, between approximately 0.2 millimeters and 2 millimeters. The 10 bit magnetic position sensor 505 measures the angular position of the test magnet 510 and determines an integer value between zero and 1,023 that corresponds to the detected angular position of the test magnet 510. The determined integer value is displayed on a display 520 that is also coupled to the circuit board 515. For example, in FIG. 5B, the test magnet 510 is positioned at a first angular position and the display 520 displays a determined integer value of 358. FIG. 5C illustrates the test magnet 510 after the test magnet 510 has been moved from the first angular position to a second angular position. The display 520 in FIG. 5C displays a determined integer value of 572 for the second angular position. In some embodiments, the first magnetic position encoder 114 and the second magnetic position encoder 116 include a 10 bit magnetic position sensor (such as the 10 bit magnetic position sensor 505 described above).

The first magnetic position sensor 160 measures the angular position of the first magnet 158 and generates a position signal indicating the measured angular position of the first magnet 158. As rotational movement between the first magnet 158 and the first magnetic position sensor 160 mirrors the rotational movement of the housing 102 about the first axis of rotation 124, the position signal also indicates the angular position of the housing 102 about the first axis of rotation 124. In some embodiments, the position signal includes a digital value indicating the measured angular position of the first magnet 158. For example, for when the first magnetic position sensor 160 includes a 10 bit magnetic position sensor (such as the 10 bit magnetic position sensor 505 described above), the position signal can include a digital integer value between zero and 1,023. Alternatively or in addition, the position signal includes a pulse width modulated signal in which the duty cycle indicates the measured angular position of the first magnet 158. For example, a ten percent duty cycle may indicate that the measured angular position of the first magnet 158 is 36 degrees and a five percent duty cycle may indicate that the measured angular position of the first magnet 158 is 18 degrees. In some embodiments, the first magnetic position sensor 160 outputs the absolute angular position of the first magnet 158 as a 10-bit value over a serial data link.

The second magnetic position sensor 166 measures the angular position of the second magnet 164 and generates a position signal indicating the measured angular position of the second magnet 164. As rotational movement between the second magnet 164 and the second magnetic position sensor 166 mirrors the rotational movement of the housing 102 about the second axis of rotation 126, the position signal also indicates the angular position of the housing 102 about the second axis of rotation 124. In some embodiments, the position signal generated by the second magnetic position sensor 166 is similar to the position signal generated by the first magnetic position sensor 160 described above.

Figure 6:
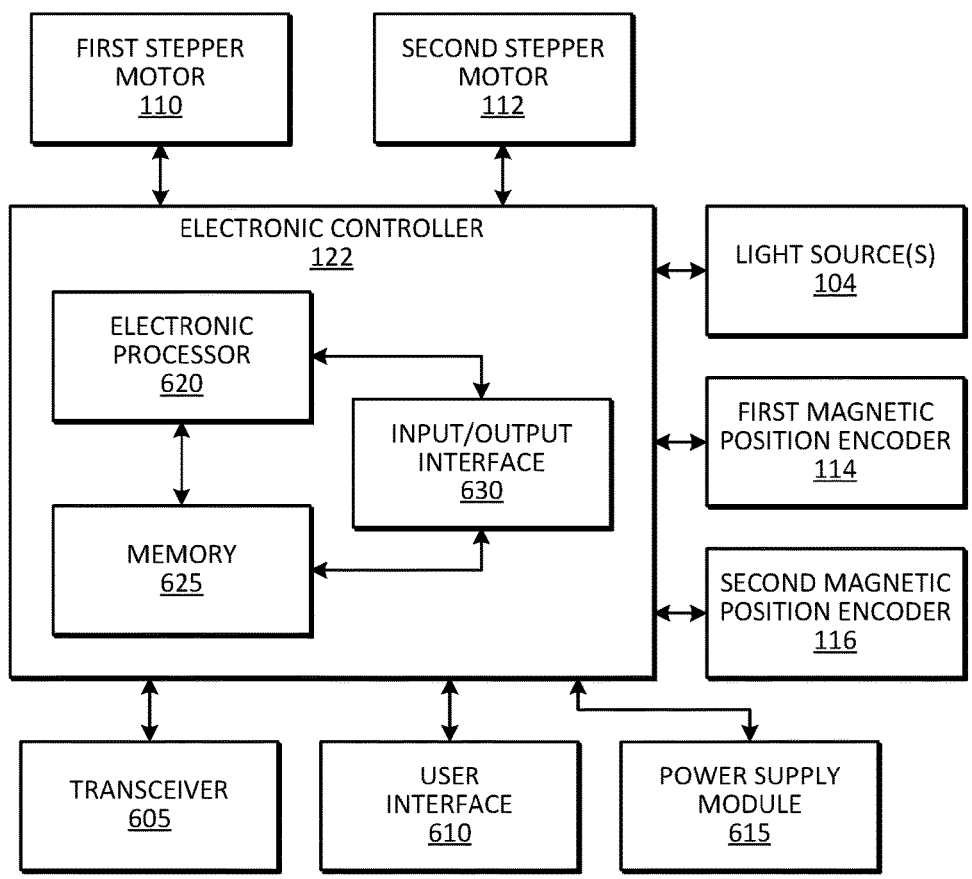
FIG. 6 is a block diagram of a moving light fixture, in accordance with some embodiments.

FIG. 6 is an example embodiment of the moving light fixture 100. The embodiment illustrated in FIG. 6 includes the one or more light sources 104, the first stepper motor 110, the second stepper motor 112, the first magnetic position encoder 114, the second magnetic position encoder 116, the electronic controller 122, a transceiver 605, a user interface 610, and a power supply module 615.

The electronic controller 122 includes a plurality of electrical and electronic components that provide power, operational control, and protection to the components and modules within the moving light fixture 100. The electronic controller 122 illustrated in FIG. 6 includes, among other things, an electronic processor 620 (for example, a microprocessor, a microcontroller, or another suitable programmable device), memory 625, and an input/output interface 630. The electronic processor 620, the memory 625, and the input/output interface 630, as well as the various modules connected to the electronic controller 122 are connected by one or more control and/or data buses (for example, a common bus). The control and/or data buses are shown generally in FIG. 6 for illustrative purposes. The input/output interface 630 includes routines for transferring information between components within the electronic controller 122 and other components of the moving light fixture 100. In some embodiments, the electronic controller 122 is implemented partially or entirely on a semiconductor (for example, a field-programmable gate array ["FPGA"] semiconductor) chip.

The memory 625 includes, for example, read-only memory (ROM), random access memory (RAM) (for example, dynamic RAM [DRAM], synchronous DRAM [SDRAM], etc.), electrically erasable programmable read-only memory (EEPROM), flash memory, a hard disk, an SD card, other non-transitory computer-readable media, or a combination thereof. The electronic processor 620 is connected to the memory 625 and executes software instructions that are capable of being stored in a RAM of the memory 625 (for example, during execution), a ROM of the memory 625 (for example, on a generally permanent basis), or another non-transitory computer readable medium such as another memory or a disc. Alternatively or in addition, the memory 625 is included in the electronic processor 620. Software included in some implementations of the moving light fixture 100 can be stored in the memory 625 of the electronic controller 122. The software includes, for example, firmware, one or more applications, program data, filters, rules, one or more program modules, and other executable instructions. The electronic processor 620 is configured to retrieve program instructions and data from the memory 625 and execute, among other things, program instructions to perform the methods described herein. For example, the electronic controller 122 is configured to execute program instructions retrieved from the memory 625 for generating necessary control signals for the first stepper motor 110 and the second stepper motor 112 that are required to drive the motors to move the moving light fixture 100 to a desired position. In other constructions, the electronic controller 122 includes additional, fewer, or different components.

The transceiver 605 sends and/or receives signals to and/or from one or more separate communication modules in other components of a lighting system (for example, a control board, other light fixtures, etc.). Signals may include, for example, information, data, serial data, data packets, analog signals, or a combination thereof. The transceiver 605 can be coupled to one or more separate transceivers via wires, fiber, wirelessly, or a combination thereof. Communication via wires, fiber, or both can be any appropriate network topology known to those skilled in the art, such as Ethernet. Wireless communication can be any appropriate wireless network topology known to those skilled in the art, such as Wi-Fi, ZigBee®, Bluetooth®, and the like. In some embodiments, the transceiver 605 includes separate transmitters and receivers.

The user interface 610 is included to control the moving light fixture 100 or the operation of a lighting system as a whole. The user interface 610 is operably coupled to the electronic controller 122 to control, for example, the position of the moving light fixture 100. The user interface 610 can include any combination of digital and analog input devices required to achieve a desired level of control for the system. For example, the user interface 610 can include a computer having a display and input devices, a touch-screen display, a plurality of knobs, dials, switches, buttons, faders, or the like. In some constructions, the user interface 610 is separated from the moving light fixture 100.

The power supply module 615 supplies a nominal AC or DC voltage to moving light fixture 100 of system of moving light fixtures. The power supply module 615 is powered by mains power having nominal line voltages between, for example, 100 Volt and 240 Volt AC and frequencies of approximately 50 Hertz to 60 Hertz. The power supply module 615 is also configured to supply lower voltages to operate circuits and components within the moving light fixture 100. Alternatively or in addition, the moving light fixture 100 is powered by one or more batteries or battery packs.

The electronic controller 122 controls the position of the moving light fixture 100 via the first stepper motor 110 and the second stepper motor 112. The electronic controller 122 is operably coupled to the first stepper motor 110 and to the second stepper motor 112 to provide one or more control signals thereto. In some embodiments, the control signals are modulated current pulses which directly drive the first stepper motor 110 and the second stepper motor 112. Alternatively, the control signals regulate modulated current pulses that are generated internally by the first stepper motor 110 and the second stepper motor 112.

As described above, the current micro step of the first stepper motor 110 is set based on the current pulses supplied. Thus, the electronic controller 122 can determine the current micro step of the first stepper motor 110 based on the control signals it sends to the first stepper motor 110. However, the first stepper motor 110 rotates between full steps based on the order of control signals it sends. Thus, the electronic controller 122 can determine how many full steps the first stepper motor 110 has rotated but is unaware of the current full step unless the starting full step is known. Upon start-up, the electronic controller 122 does not know the current full step of the first stepper motor 110. As described herein, the first magnet 158 (or the first magnetic position sensor 160) is operably coupled to the housing 102 such that it rotates with the housing 102 about the first axis of rotation 124. Thus, the measured angular position of the first magnet 158 mirrors the angular position of the rotor 410 in the first stepper motor 110. By measuring the angular position of the first magnet 158 with the first magnetic position sensor 160, the electronic controller 122 is determines the current full step of the first stepper motor 110. In a similar manner, the electronic controller 122 determines the current full step of the second stepper motor 112 by measuring the angular position of the second magnet 164 with the second magnetic position sensor 166.

The resolution of the first magnetic position encoder 114 is greater than the full step resolution of the first stepper motor 110 such that the first magnetic position encoder 114 can measure multiple angular positions of the first magnet 158 for each full step of the first stepper motor 110. For example, if the first magnetic position encoder 114 includes 10 bits of resolution and the first stepper motor 110 includes 200 full steps, the first magnetic position encoder 114 is able to measure approximately 51 distinct angular positions of the first magnet 158 for each full step of the first stepper motor 110. Similarly, the resolution of the second magnetic position encoder 116 is greater than the full step resolution of the second stepper motor 112 such that the second magnetic position encoder 116 can measure multiple angular positions of the second magnet 164 for each full step of the second stepper motor 112.

In some embodiments, the electronic controller 122 determines the absolute position of the moving light fixture 100 based in part on the current full step of the first stepper motor 110, the current micro step of the first stepper motor 110, the current full step of the second stepper motor 112, the current micro step of the second stepper motor 112, or a combination thereof. With the knowledge of the current absolute position of the moving light fixture 100, the electronic controller 122 is able to determine the number of both full steps and micro steps to rotate the first stepper motor 110, the second stepper motor 112, or both to adjust the moving light fixture 100 from its current position to a new position (for example, a target position).

Figure 7:
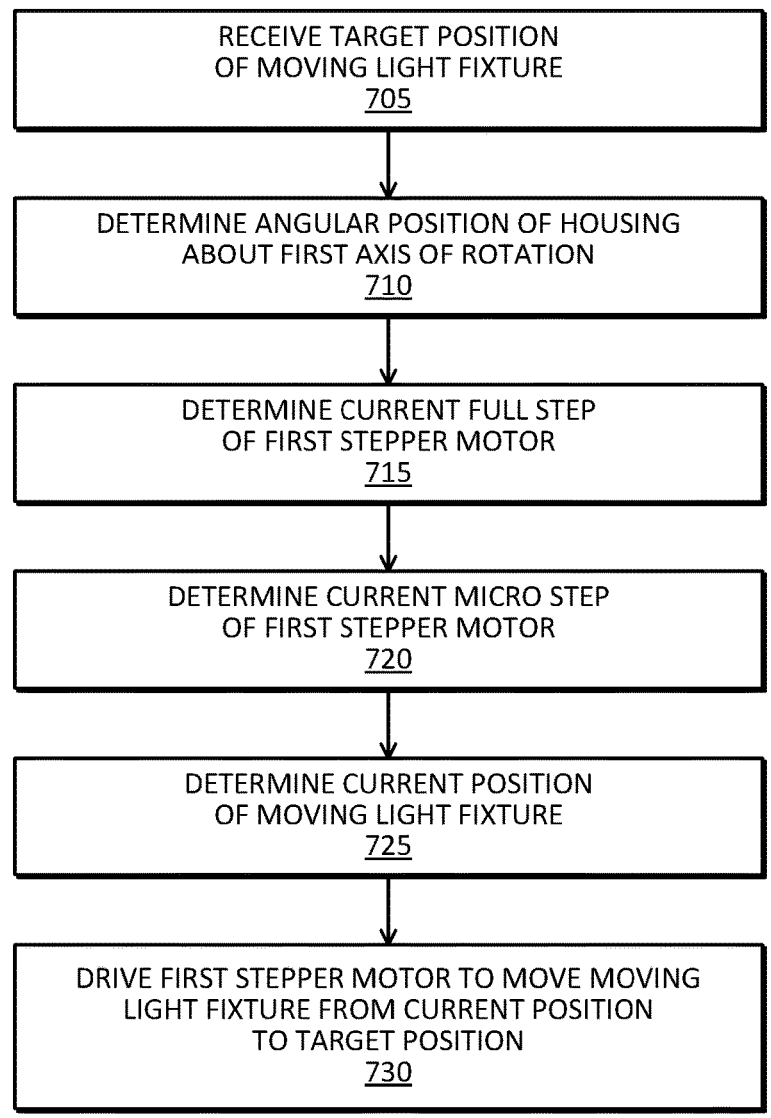
FIG. 7 is a flowchart of a method of controlling a position of a moving light fixture about a single axis of rotation, in accordance with some embodiments.

FIG. 7 illustrates an example method 700 for controlling the position of the moving light fixture 100 about a single axis of rotation. For brevity, the method 700 is described in terms of controlling the position of the moving light fixture 100 about the first axis of rotation 124 (i.e., tilting movements). However, the same or a similar method may also be used to control the position of the moving light fixture 100 about the second axis of rotation 126 (i.e., panning movements). The steps of the method 700 are described in an iterative manner for descriptive purposes. Various steps described herein with respect to the method 700 are capable of being executed simultaneously, in parallel, or in an order that differs from the illustrated serial and iterative manner of execution.

At block 705, the electronic controller 122 receives a target position of the moving light fixture 100. In some embodiments, the target position includes a desired angle of rotation of the housing 102 about the first axis of rotation 124 with respect to a predetermined reference position. For example, the target position can indicate a desire angle of 45 degrees away from the reference position about the first axis of rotation 124. Alternatively or in addition, the target position includes a numerical value that corresponds to desired angle of rotation of the housing 102 about the first axis of rotation 124 with respect to a predetermined reference position. For example, a target position of 3 on a scale between 1 and 10 may indicate a desire angle of 45 degrees away from the reference position about the first axis of rotation 124. In some embodiments, the electronic controller 122 receives the target position via the user interface 610. For example, a user inputs the target position via buttons included in some embodiments of the user interface 610. Alternatively or in addition, the electronic controller 122 receives the target position via the transceiver 605. For example, the electronic controller 122 receives the target position via the transceiver 605 from a central control board in a theater.

At block 710, the first magnetic position encoder 114 determines the angular position of the housing about the first axis of rotation 124. In some embodiments, the first magnetic position sensor 160 determines and transmits the measured angular position of the first magnet 158 to the electronic controller 122. Alternatively or in addition, the first magnetic position sensor 160 transmits a position signal to the electronic controller 122 indicating the measured angular position of the first magnet 158, and the electronic controller 122 determines the angular position of housing 102 about the first axis of rotation 124 based on the received position signal. In some embodiments, the angular position of the housing 102 is determined as a degree value between, for example, zero degrees and 360 degrees. Alternatively or in addition, the angular position of the housing 102 is determined as a numerical value in a range of detectable angular positions. For example, the determined angular position of the housing 102 can be an integer value between zero and 1,024 when the first magnetic position sensor 160 includes 10 bits of resolution.

At block 715, the electronic controller 122 determines the current full step of the first stepper motor 110 based on the angular position of the housing 102 about the first axis of rotation 124. Each full step of the first stepper motor 110 maps to a range of angular positions of the housing 102. In some embodiments, a mapping between the detectable angular positions of the housing 102 and the full steps of the first stepper motor 110 are included in a look up table stored, for example, in the memory 625. In such embodiments, the electronic controller 122 uses the look up table to determine the full step of the first stepper motor 110 that maps to the angular position of the housing 102 detected by the first magnetic position encoder 114. For example, an angular position of 18 degrees for the housing 102 (or a numerical value of 51 on an 10 bit scale) maps to the tenth full step of the first stepper motor 110, and the angular position of 36 degrees for the housing 102 (or a numerical value of 102 on an 10 bit scale) maps to the twentieth full step of the first stepper motor 110.

At block 720, the electronic controller 122 determines the current micro step of the first stepper motor 110. In some embodiments, the electronic controller 122 determines the micro step based on one or more control signals sent to the first stepper motor 110 by the electronic controller 122 as described herein.

At block 725, the electronic controller 122 determines the current position of the moving light fixture 100 based in part on the current full step and the current micro step of the first stepper motor 110. In some embodiments, the current position is an angle. For example, if the full step of the first stepper motor 110 is designated by $S_{Full}$ and the micro step of the first stepper motor 110 is designated by $S_{Micro}$, the current position, P, of the moving light fixture 100 can be calculated as shown below in EQN 1. EQN 1 can be used to calculate the angular position of the moving light fixture 100.

$$P=(S_{Full}\times 1.8°)+(S_{Micro}\times 0.007°) \quad \text{EQN 1}$$

For example, the electronic controller 122 determines that the current position of the moving light fixture 100 is 41.778 degrees when the current full step is 23 and the current micro step is 54 (i.e., $(23\times 1.8°)+(54\times 0.007°)=41.778°$).

At block 730, the electronic controller 122 drives the first stepper motor 110 to move the moving light fixture 100 from the current position to the target position. In some embodiments, the electronic controller 122 sends one or more control signals to the first stepper motor 110 to change the current full step and the current micro step of the first stepper motor 110 to a target full step and micro step that correspond to the received target position of the moving light fixture 100. In some embodiments, the one or more control signals include a plurality of current pulses which cause the full step and the micro step of first stepper motor 110 to change from their current values to the target values. Alternatively or in addition, the one or more control signals indicate the number of full steps the first stepper motor 110 should move, the direction of the movement (for example, clockwise or counter-clockwise), and the target micro step. For example, the one or more control signals may indicate that the first stepper motor 110 should move 37 full steps and 100 micro steps in a clockwise direction.

Figure 8:
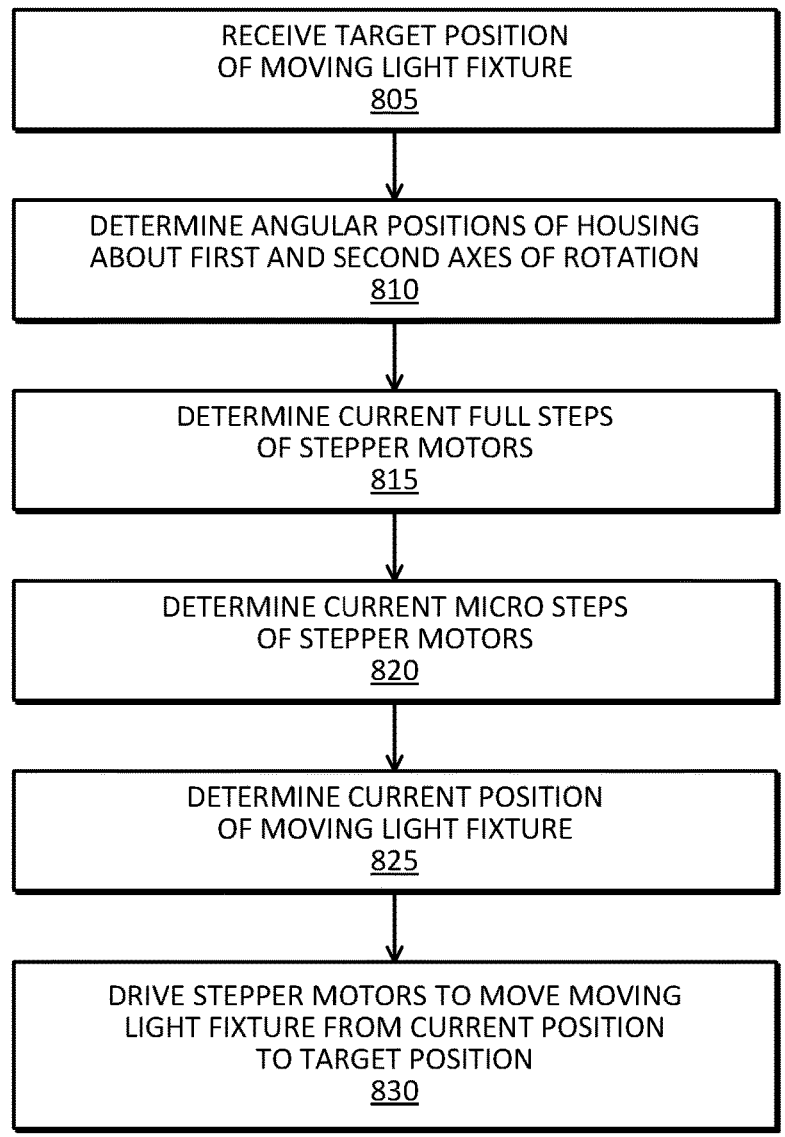
FIG. 8 is a flowchart of a method of controlling a position of a moving light fixture about two different axes of rotation, in accordance with some embodiments.

FIG. 8 illustrates an example method 800 for controlling the position of the moving light fixture 100 about two different axes of rotation. The method 800 is described in terms of controlling the position of the moving light fixture 100 about the first axis of rotation 124 and the second axis of rotation 126 (i.e., tilting movements and panning movements). The steps of the method 800 are described in an iterative manner for descriptive purposes. Various steps described herein with respect to the method 800 are capable of being executed simultaneously, in parallel, or in an order that differs from the illustrated serial and iterative manner of execution.

At block 805, the electronic controller 122 receives a target position of the moving light fixture 100. In some embodiments, the target position includes a desired angle of rotation of the housing 102 about the first axis of rotation 124 with respect to a predetermined reference position, a desired angle of rotation of the housing 102 about the second axis of rotation 126 with respect to a predetermined reference position, or both. At block 810, the first magnetic position encoder 114 determines an angular position of the housing 102 about the first axis of rotation 124 (for example, a first angular position). The second magnetic position encoder 116 determines an angular position of the housing 102 about the second axis of rotation 126 (for example, a second angular position). At block 815, the electronic controller 122 determines the current full step of the first stepper motor 110 based on the angular position of the housing 102 about the first axis of rotation 124. The electronic controller 122 also determines the current full step of the second stepper motor 112 based on the angular position of the housing 102 about the second axis of rotation 126. At block 820, the electronic controller 122 determines the current micro step of the first stepper motor 110 and the current micro step of the second stepper motor 112. At block 825, the electronic controller 122 determines the current position of the moving light fixture 100 based in part on the current full step of the first stepper motor 110, the current micro step of the first stepper motor 110, the current full step of the second stepper motor 112, the current micro step of the second stepper motor 112, or a combination thereof. At block 830, the electronic controller 122 drives the first stepper motor 110 and the second stepper motor 112 to move the moving light fixture 100 from the current position to the target position.

Aside from moving the moving light fixture 100 in response to receiving a target position, the electronic controller 122 can move the moving light fixture 100 to restore it to a target position when the moving light fixture 100 is hit by an object or hits an object. For example, the moving light fixture 100 may hit a piece of nearby scenery while moving to a target position. As a further example, the moving light fixture 100 may be hit by a nearby object while the moving light fixture 100 is positioned at a target position. In some embodiments, in the manner described herein, the electronic controller 122 detects the current position of the moving light fixture 100 continuously or periodically based on the measured angular position from the first magnetic position encoder 114, the measured angular position from the second magnetic position encoder 116, the current micro step of the first stepper motor 110, the current micro step of the second stepper motor 112, or a combination thereof. Responsive to detecting an unplanned change in position, the electronic controller 122 may use the newly determined position of the moving light fixture 100 to drive the first stepper motor 110 and the second stepper motor 112 to move the moving light fixture 100 to the target position.

Thus, the disclosure provides a moving light fixture and a method for controlling the position of the moving light fixture. Various features and advantages of the disclosure are set forth in the following claims.

What is claimed is:

1. A moving light fixture comprising:
   a housing;
   one or more light sources disposed within the housing;
   a stepper motor operably coupled to the housing such that the stepper motor rotates the housing about an axis of rotation;
   a magnetic position encoder configured to transmit a position signal indicating an angular position of the housing about the axis of rotation; and
   an electronic controller configured to
      receive a target position of the moving light fixture,
      determine the angular position of the housing about the axis of rotation based on the position signal,
      determine a current full step of the stepper motor based on the angular position of the housing about the axis of rotation,
      determine a current micro step of the stepper motor,
      determine a current position of the moving light fixture based on the current full step of the stepper motor and the current micro step of the stepper motor, and
      drive the stepper motor to move the moving light fixture from the current position to the target position.

2. The moving light fixture of claim 1, wherein a resolution of the magnetic position encoder is less than or equal to twelve bits.

3. The moving light fixture of claim 1, wherein the electronic controller is further configured to determine the current micro step of the stepper motor based on one or more control signals transmitted to the stepper motor from the electronic controller.

4. The moving light fixture of claim 1, further comprising a frame coupled to the housing such that the housing is rotatable relative to the frame about the axis of rotation,
   wherein the magnetic position encoder including
      a magnet operably coupled to the housing such that the magnet rotates with the housing about the axis of rotation, and
      a magnetic position sensor fixably coupled to the frame and positioned adjacent to the magnet.

5. The moving light fixture of claim 1, further comprising a frame coupled to the housing such that the housing is rotatable relative to the frame about the axis of rotation,
   wherein the magnetic position encoder including
      a magnetic position sensor operably coupled to the housing such that the magnetic position sensor rotates with the housing about the axis of rotation, and
      a magnet fixably coupled to the frame and positioned adjacent to the magnetic position sensor.

6. The moving light fixture of claim 1, further comprising a base coupled to the housing such that the housing is rotatable relative to the base about the axis of rotation,
   wherein the magnetic position encoder including
      a magnet operably coupled to the housing such that the magnet rotates with the housing about the axis of rotation, and
      a magnetic position sensor fixably coupled to the base and positioned adjacent to the magnet.

7. The moving light fixture of claim 1, further comprising a base coupled to the housing such that the housing is rotatable relative to the base about the axis of rotation,
   wherein the magnetic position encoder including
      a magnetic position sensor operably coupled to the housing such that the magnetic position sensor rotates with the housing about the axis of rotation, and
      a magnet fixably coupled to the base and positioned adjacent to the magnetic position sensor.

8. The moving light fixture of claim 1, wherein upon start up, the electronic controller is configured to determine the current position of the moving light fixture prior to moving the moving light fixture with the stepper motor.

9. A method of controlling a position of a moving light fixture, the moving light fixture including one or more light sources disposed within a housing, and a stepper motor operably coupled to the housing such that the stepper motor rotates the housing about an axis of rotation, the method comprising:
   receiving a target position of the moving light fixture;
   determining, with a magnetic position encoder, an angular position of the housing about the axis of rotation;
   determining, with an electronic controller, a current full step of the stepper motor based on the angular position of the housing about the axis of rotation;
   determining, with the electronic controller, a current micro step of the stepper motor;
   determining, with the electronic controller, a current position of the moving light fixture based on the current full step of the stepper motor and the current micro step of the stepper motor; and
   driving the stepper motor to move the moving light fixture from the current position to the target position.

10. The method of claim 9, wherein the axis of rotation is a first axis of rotation, wherein the moving light fixture further including a second stepper motor operably coupled to the housing such that the second stepper motor rotates the housing about a second axis of rotation, wherein the second axis of rotation is perpendicular to the first axis of rotation, wherein the method further comprising
   determining, with a second magnetic position encoder, a second angular position of the housing about the second axis of rotation;
   determining, with the electronic controller, a current full step of the second stepper motor based on the second angular position of the housing about the second axis of rotation;
   determining, with the electronic controller, a current micro step of the second stepper motor;
   determining, with the electronic controller, the current position of the moving light fixture based on the current full step of the second stepper motor and the current micro step of the second stepper motor; and driving the second stepper motor to move the moving light fixture from the current position to the target position.

11. The method of claim 9, wherein determining the current micro step of the stepper motor includes determining the current micro step of the stepper motor based on one or more control signals transmitted to the stepper motor from the electronic controller.

12. The method of claim 9, further comprising upon start up, determining, with the electronic controller, the current position of the moving light fixture prior to moving the moving light fixture with the stepper motor.

13. A moving light fixture comprising:

a housing;

one or more light sources disposed within the housing;

a first stepper motor coupled to the housing such that the first stepper motor rotates the housing about a first axis of rotation;

a second stepper motor operably coupled to the housing such that the second stepper motor rotates the housing about a second axis of rotation;

a first magnetic position encoder configured to transmit a first position signal indicating a first angular position of the housing about the first axis of rotation;

a second magnetic position encoder configured to transmit a second position signal indicating a second angular position of the housing about the second axis of rotation; and an electronic controller configured to receive a target position of the moving light fixture;

determine the first angular position of the housing about the first axis of rotation based on the first position signal, determine a current full step of the first stepper motor based on the first angular position of the housing about the first axis of rotation, determine the second angular position of the housing about the second axis of rotation based on the second position signal, determine a current full step of the second stepper motor based on the second angular position of the housing about the second axis of rotation, determine a current position of the moving light fixture based on the current full step of the first stepper motor and the current full step of the second stepper motor, and drive the first stepper motor and the second stepper motor to move the moving light fixture from the current position to the target position.

14. The moving light fixture of claim 13, wherein the second axis of rotation is perpendicular to the first axis of rotation.

15. The moving light fixture of claim 14, wherein the electronic controller is further configured to determine a current micro step of the first stepper motor, determine a current micro step of the second stepper motor, and determine the current position of the moving light fixture based on the current full step of the first stepper motor, the current micro step of the first stepper motor, the current full step of the second stepper motor, and the current micro step of the second stepper motor.

16. The moving light fixture of claim 14, further comprising a frame coupled to the housing such that the housing is rotatable relative to the frame about the first axis of rotation;

a first shaft fixably coupled to a first side of the housing along the first axis of rotation;

a second shaft fixably coupled to a second side of the housing along the first axis of rotation, wherein the second side of the housing opposite from the first side of the housing;

a first pulley fixably mounted to a first output shaft of the first stepper motor for rotation therewith; and a second pulley coupled to the first pulley via a first belt to transfer torque therebetween, the second pulley fixably mounted to the first shaft to rotate the first shaft about the first axis of rotation.

17. The moving light fixture of claim 16, wherein the first magnetic position encoder including a first magnet fixably mounted to the first shaft or the second shaft such that the first magnet rotates with the housing about the first axis of rotation, and a first magnetic position sensor fixably coupled to the frame and positioned adjacent to the first magnet.

18. The moving light fixture of claim 16, further comprising a base coupled to the frame such that the frame and the housing are rotatable relative to the base about the second axis of rotation;

a third shaft fixably coupled to the base and partially extending into the frame;

a third pulley fixably mounted to a second output shaft of the second stepper motor for rotation therewith; and a fourth pulley coupled to the third pulley via a second belt to transfer torque therebetween, the fourth pulley fixably coupled to the third shaft.

19. The moving light fixture of claim 18, further comprising a fourth shaft fixably coupled to rotate with the frame about the second axis of rotation, the fourth shaft partially disposed within the base;

a fifth pulley fixably mounted to the fourth shaft to rotate with the fourth shaft about the second axis of rotation, the fifth pulley disposed within the base; and a sixth pulley coupled to the fifth pulley via a third belt to transfer torque therebetween.

20. The moving light fixture of claim 19, wherein the second magnetic position encoder including a second magnet fixably mounted to the sixth pulley such that the second magnet rotates with the housing about the second axis of rotation, and a second magnetic position sensor fixably coupled to the base and position adjacent to the magnet.

* * * * *